United States Patent [19]
Villani et al.

[11] 3,889,347
[45] June 17, 1975

[54] METHOD OF MAKING COMBUSTIBLE METAL FLASHLAMP CHARGES

[75] Inventors: Gerard J. Villani, Needham; Ronald P. Fedora, Marlboro, both of Mass.

[73] Assignee: Norton Company, Worcester, Mass.

[22] Filed: Aug. 7, 1972

[21] Appl. No.: 278,469

[52] U.S. Cl............ 29/417; 29/419 R; 29/420.5; 29/423; 29/191.2; 264/111; 431/93
[51] Int. Cl............................................ B23p 17/04
[58] Field of Search........ 29/419 R, 420.5, DIG. 31, 29/417, 423, 191.2, 198; 148/6.14 R; 264/111

[56] References Cited
UNITED STATES PATENTS

| | | | |
|---|---|---|---|
| 3,184,840 | 5/1965 | Byrne et al. | 29/420.5 |
| 3,337,337 | 8/1967 | Weeton et al. | 29/419 X |
| 3,413,707 | 12/1968 | Klein et al. | 29/419 |
| 3,640,693 | 2/1972 | Galasso et al. | 29/419 X |
| 3,740,834 | 6/1973 | Douglass | 29/419 X |
| 3,742,369 | 6/1973 | Douglass | 29/419 X |

Primary Examiner—Charles W. Lanham
Assistant Examiner—D. C. Reiley, III
Attorney, Agent, or Firm—Jerry Cohen

[57] ABSTRACT

Combustible metal charges for use as flashlamp fuels and in like applications are made by forming a porous compact of powder of the combustible metal in a matrix of powder or other solid form of a second metal and working the composite structure to fiberize the individual powder particles of combustible metal and then removing the matrix to form an elongated charging plant feed which can be cut to unit charge lengths for individual flashlamps. The charge product is a porous mass of mechanically interlocked fibers.

11 Claims, 13 Drawing Figures

METHOD OF MAKING COMBUSTIBLE METAL FLASHLAMP CHARGES

BACKGROUND OF THE INVENTION

The present invention relates to finely divided materials for use as combustible metal fuel charges in photoflash lamps and the like.

Photoflash lamps are used for taking photographs under poor lighting conditions and for high speed photography. The lamps are generally semi-transparent bulbs filled with a finely divided combustible metal material which in past decades was shredded aluminum foil or aluminum or magnesium powder and in commercial products of the 1950's and 1960's has been zirconium or hafnium foil which is slit to make fiber units which are fed into bulbs as porous fiber bundles. A precisely metered metal fiber bundle is fed into the flashlamp bulb as the fuel charge for that bulb. Depending on the metal used, the spectral output of the burning material peaks somewhere between 4,000° and 6,000°K "color temperature." The light output of the flash lamp of a type in present commercial use peaks out about 70,000 lumens in the time period of 20 to 40 milli. sec. after camera shutter opening, coinciding with ignition of the flashlamp.

The trend towards miniaturization of flashlamps sets a limit on the amount of metal fuel that can be incorporated and it threfore becomes necessary to attain more efficient combustion of a limited weight of metal fuel. An increase in surface to volume ratio, with the increased surface being available for contact with oxidizer, is necessary. Present technology does not afford a significant opening for such improvement. The refractory metal foils, such as zirconium, can be rolled to a lower practical limit of thickness between 0.5 and 1.0 mils. Such foils can be slit to a width essentially no less than their thickness and the art is now at the point where a high rate of consumption and wear of carbide shearing blades is encountered. One solution of the art to increase light intensity (while shifting to a more desired color temperature) has been to substitute hafnium or yttrium for zirconium to gain more light intensity at given dimensions of the metal fiber in the combustion package. But this is an expensive solution because the prices of hafnium and yttrium are much greater than that of zirconium. These prior art flashlamp combustible metal fuel feed fabrication techniques are described in U.S. Pat. No. 3,336,646, 3,600,120, 3,584,990, 3,568,281, 3,120,694, 2,297,368, 2,982,119, 3,188,162, 3,304,750, 3,675,004, 3,672,814.

It is therefore an inportant object of the invention to provide a refractory metal foil product in fiber form with substantially reduced cross-section dimensions compared to the above described prior art limits, consistent with being in form suitable for use in flashlamps and the like.

It is a further object of the invention to step up the level of usability of given materials, making zirconium available for effective use in applications now served by hafnium, correspondingly stepping up the usability of hafnium or yttrium for higher light outputs in a given space, and making available to the industry metals such as rare earths which were heretofore less feasible due to the difficulty of working them into fiber — like or filamentary form by conventional methods.

SUMMARY OF THE INVENTION

Powders of the combustible metal are formed into a compact having a separating second phase of matrix metal. Typically, this would comprise mixed zirconium and copper powders with the zirconium powders comprising 20 to 50 volume percent of a homogeneous intimate mixture of the two powder materials. Other forms of the compact would include a sintered powder compact impregnated by a molten (and then cooled) phase of the second material as described in the copending U.S. patent applications, 196,812 and 199,065, now U.S. Pat. Nos. 3,741,357 and 3,740,834 respectively, of Douglass. Several other fabrication techniques are described in U.S. Pat. Nos. 3,029,496 (Levi), 3,413,707 (Klein), 3,337,337 (Weeton), and 3,540,114, 3,505,039 and 3,505,038 (Brunswick Corp., assignee) for fibering.

The two metal compact is formed into a billet. The billet is longitudinally elongated through a working process involving the application of compressive forces in the transverse direction. In the initial stages of such working, the second phase material work hardens and then acts to transmit the working forces to the primary material (e.g., zirconium powder) to compress it and elongate it, forming it into a fiber. After elongating the original compact to a high degree, the second phase material (which is also similarly fibered) is removed through thermal, chemical or electrochemical methods.

The compact formation and size reduction procedures are controlled so that the finally leached product is one suitable for continuous feed into a flash lamp production line—referred to herein as a charging plant feed. The characteristics of such a product are that the elongated compact, as a whole, has adequate tensile strength for mass production handling as an elongated web. Another characteristic of the charging plant feed or unit length flashlamp charges therefrom is that the internal volume of the material comprises uniform linear density, the porous structure thereof being defined by mechanically interlocked fibers.

The process can use economical starting materials such as refractory metal or rare earth metal sponge, scrap and dehydrided like—which can be hydrided, ground and dehydrid to produce a suitable starting powder.

Continuous assembly of the initial billet can be made through known powder working techniques, such as roll compaction, to the point that a continuous production line can replace a series of discrete billet assemblies.

Along with the flashlamp application, like applications of the family or products described above are in pyrotechnics, explosives and rocket solid fuels, and getters for vacuum valve and cathode ray tube vacuum hardening.

In connection wtih utility for all the above applications, the second phase removal generally involves the use of a procedure which will cause a passivation of the surface of the main material to limit the chances of its premature ignition.

Numerous other objects, features and advantages of the present invention will be apparent from the following detailed description of preferred embodiments, taken together with the accompanying drawing in which

DETAILED DESCRIPTION OF PREFERRED EMBODIMENTS

Figure 1:
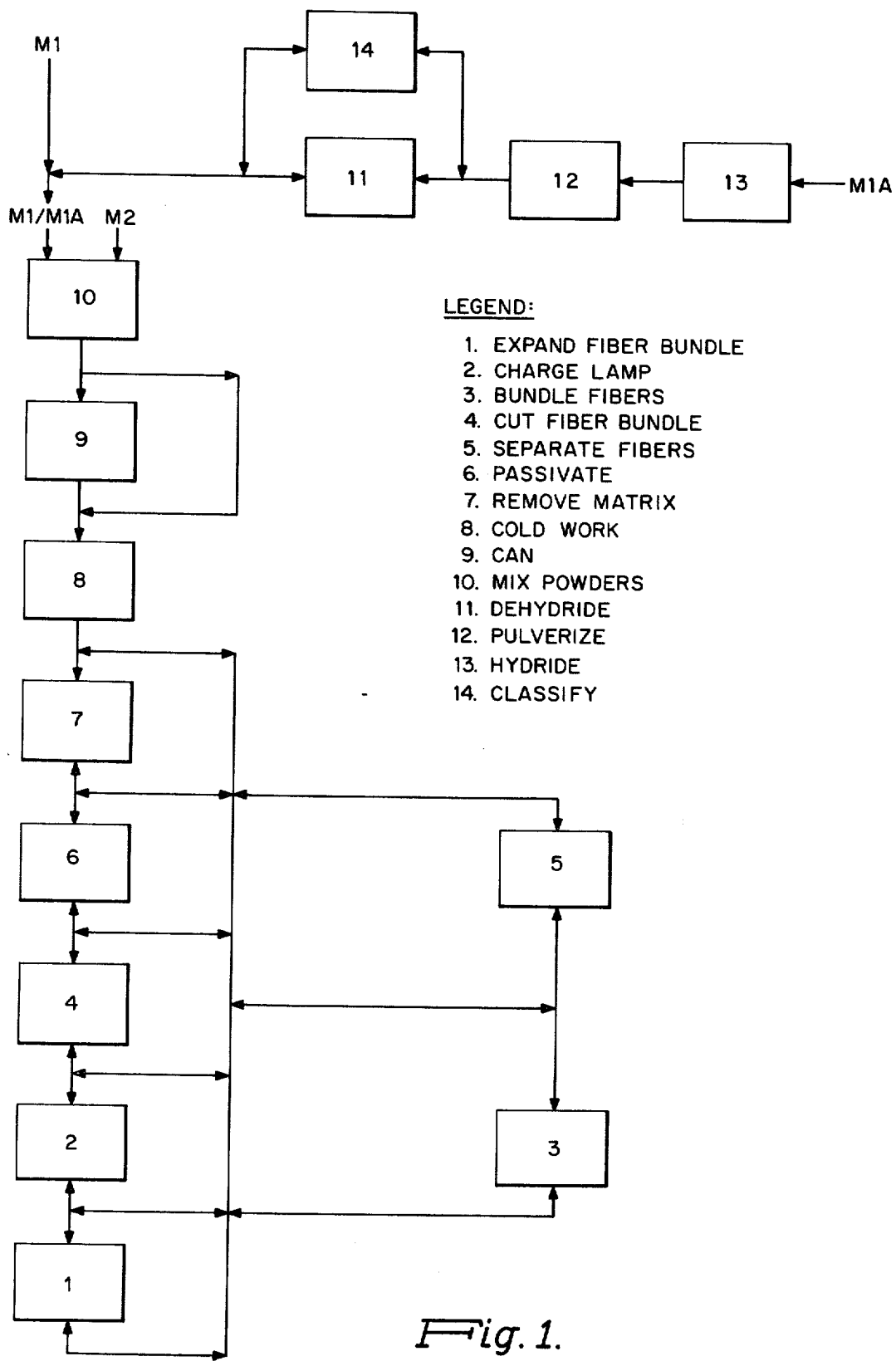
FIG. 1 is a block diagram of the method of producing charging plant feed and unit charges.

Referring now to the drawings and more particularly FIG. 1 thereof, there is shown a flow chart of process steps — indicated as blocks which are numbered — of a basic process and variations thereof for making a charging plant feed which is cut into discreet lengths constituting single flashlamp metal fuel charges for flashlamp manufacture.

The material to be fibered from powder is indicated as M1, or as M1A for an alternative source. The matrix metal is indicated as M2.

The preferred group of metals for use as combustible metal fuels in accordance with the present invention comprises hafnium, yttrium, tungsten, uranium, vanadium, lanthanum, cerium, scandium, tantalum, zirconium, niobium and titanium.

The M1/M1A combustible metals may also be present as alloys or compounds thereof. The present process is highly tolerant of metal impurities compared to alternative processes, such as the conventional foil rolling process. Purity levels of two to three nines may be utilized in the starting powder. Particulate forms of metal scrap or sponge are also utilizable as the starting powders or available scrap or sponge forms may be pulverized as described below.

The matrix material must be one which is capable of transmitting cold work stresses to the powder to cause them to fiber, either through intrinsic hardness or through capability of work hardening during the initial stages of fabrication to the requisite hardness level. Copper in elemental form meets this requirement for essentially all the above metals. Alloyed copper and other metals such as lead, magnesium, aluminum and iron and non-metals, such as plastics and ceramics can be used depending on the reduction ratios, combustile metal and volume ratios (of M2 to M1 or M1A) involved in a particular case. An additional requirement of the matrix is that it shall be removable from the worked composite under conditions which do not degrade the combustibility orientation or stiffness of the fibrous combustible metal skeleton therein. Copper which is selectively leachable meets this requirement. Magnesium and plastics which have high vapor pressures are removable through thermal leaching. Acid or alkaline chemical leaching of matrix material can be supplemented or substituted by electrochemical leaching using electrical driving forces to speed up, or assure a high degree of completion, matrix metal removal.

The process is now described in terms of the numbered block steps.

Block 10: The powders are homogeneously mixed as a composite compact. The volume percentage of the combustible metal to be burned is 20–40 percent of the whole volume of the mixture, calculated on the basis of a fully consolidated mixture. The combustible metal powders are provided in a size range of 100–200 microns for the majority of powder used. The matrix powder (M2) is provided in a size range of less than a hundred microns and preferably less than about 44 microns (minus 325 U.S. standard mesh) nominal diameter. The powders M2 and M1/M1A can be of non-spherical, highly structured form or of a high degree of spherical shape. Final burning characteristics are controllable through variation of the initial powder size distribution (within the range given above) and final fiber size distribution, selection of a single combustible metal, or alloys or mixtures thereof, from the group given above, as well as through fabrication condition variations described below.

Block 9: The compact is preferably sheathed for working. In some cases the sheathing step can be omitted as indicated by the arrow in the block diagram bypassing Block 9. A thin-walled can of copper or iron, one-sixteenth of an inch thick, has been found to be suitable. During the course of the working steps described below, it may be necessary to replace the can at intermediate stages of working.

In a preferred and distinctly advantageous embodiment of the invention, minus 177 micron (minus 80 mesh) and plus 149 micron (plus 100 mesh) zirconium powders are mixed with minus 325 mesh copper powders. The mixture is isostatically pressed at 50,000 pounds per square inch. The mixture comprises 35 volume percent zirconium. It is canned in a copper sheath and the resultant product is a billet of 1.25 inches diameter by 3 inches long.

Block 8: The canned powder mixture is cold worked to an elongated form which may be a long rod or wire or may by a sheet. The cold working methods can be any of rod rolling, wire drawing, swaging, or combinations thereof or other known-cold work methods for forming circular section reduced on elongated products or rolling (in one direction) or cross rolling to produce sheet. The product is worked through a repeating series of steps with small reductions per pass. In the preferred embodiment, which was initially indicated above, the billet is reduced by swaging in a diameter reduction ratio of 1.05:1 per pass. A total reduction of 10:1 (diameter ratios of starting to finish billet) to 50:1, and preferably 20:1 to 40:1 is accomplished. If the product is to be processed to sheet, a similar reduction ratio going from billet diameter to sheet thickness should be carried out. In the case of round wire production, the area ratio is essentially the square of the diameter reduction ratio and the elongation of the elongated product is the same as the area reduction ratio. For instance, a 1-inch diameter by 1-foot long cylindrical billet can be reduced 10:1 on a diameter basis or 100:1 on an areal basis to produce a 1200-inch long final wire product, in theory. In practice, there is not an exact correspondence between billet and fiber reduction (and elongation) because the initial steps of reduction involve consolidation and the work hardening of the matrix metal before significant fibering of the metal M1/M1A takes place. However, in essentially all practical instances, the fibering reduction (areal basis) and elongation is 60–90% of the billet reduction and elongation.

It is desirable to take the first working step as a cold extrusion, using an area reduction ratio of 3:1 to 10:1. After the initial consolidation into a solid billet, whether by extrusion or multiple swaging steps intermediate working steps can be accomplished through hydrostatic extrusion achieving a 10:1 to 30:1 area reduction ratio. Subsequent reduction steps would be through swaging drawing, rod rolling, sheet rolling, and other cold work processes which are not limited as to length of the starting material.

The cold work is essentially cold from beginning to end. Small amounts of heating may be tolerated but are not particularly desirable since they tend to form matrix metal and combustion metal alloys or compounds which would reduce the available energy for combustion, as compared to preserving the combustion metal in an unreacted form throughout the processing. A small amount of heating at the end of the cold work elongation processing can be desirable to produce such an inter-phase reaction to passivate the combustion metal for handling prior to combustion. Another exception is allowed for cases where the matrix metal is itself highly combustible, as for instance where magnesium is used as a matrix. Aluminum is another example. However, subject to and including such exceptions, the working is essentially cold, meaning that alloying is avoided. Where the combustible metal requires extensive annealing in the course of working, matrix metal can be removed prior to the anneal and a similar or different matrix can be infiltrated into the bundle after the anneal.

Block 7: Upon completion of cold working, the now elongated billet, having the form of a rod, wire, sheet, tube or channel, is leached in acid or otherwise treated to remove the matrix metal. Soaking in 40% aqueous nitric acid solution is preferred for removing a copper matrix from zirconium or hafnium. The resultant product is a porous fibrous bundle with primarily mechanically interlocked fibers and including some metallurgically bonded fibers.

Depending on the degree of reduction employed, density of the starting compact, volume percent of combustible metal therein, speed of leaching and gas evolution therefrom, if any, the form of the fibrous bundle leached product will vary from a stiff rod with a high degree of controlled fiber orientation, to a loose wool with random orientation of fibers therein. For flashlamp application it is preferred to obtain an intermediate product with a form of non-rigid fiber bundle with the fibers oriented parallel to the direction of working. The same parameters also control the degree and nature of interlocking between fibers which varies from a high degree of metallurgical bonding, as well as mechanical interlocking in the stiff rods to essentially the absence of bonding or interlocking in the wool. It is preferred to have mechanical interlocking predominant over metallurgical bonding.

Block 6: The fibers should be passivated to prevent pressure combustion during handling. This step may be combined with matrix removal where the removal involves passivation. For instance, soaking in nitric acid to remove copper from a copper-zirconium worked billet produces an effective passivating oxide on the remaining zirconium.

Further passivating methods within the scope of the present invention comprise potting the leached fibrous bundle of combustible metal in a substitute organic matrix, including wax, which can be removed just prior to or even after insertion of the cut charge length into a flashlamp or the like or even retained until ignition of combustion and flash vaporized upon the onset of combustion.

Block 5: Instead of working with cut to length (or area) bundles, an alternative usage is to produce wooly masses of loose fibers in the bundle. The fibers are then randomly oriented within the mass. This can be done through rapid leaching under conditions causing evolution of gas and/or through a high reduction ratio in working and/or through a low ratio of combustible metal to matrix metal.

Block 4: The fibrous bundle from block 6 is cut to desired unit lengths (and in the case of sheet form bundles, to desired unit areas). Carbide cutting blades of the type now used for foil-to-fiber slitting or thin diameter diamond slitting wheels can be used.

Block 3: Fibrous masses are taken directly by suction from block 5 as single fibers or multi-fiber unit masses and recombined for use as flashlamp charges. This suction and recombination can be done as a separate step or in the course of lamp charging as indicated below and should be controlled to assure random orientation of fibers in the flashlamp charge.

Block 2: The unit fibrous bundle or a series of loose fibers of equal mass are charged into a flashlamp. This loading is facilitated by suction as adumbrated in U.S. Pat. Nos. 3,120,694 and 2,722,355 to Anderson et al for separated single fibers. Similar apparatus can be used for interlocked bundles.

Block 1: A flashlamp charge bundle in a lamp should, if necessary, be expanded to more nearly fill the bulb to thereby spread the fibers for more even burning and viewing access and also to lock the bundle into a known arrangement for realiability.

Blocks 11–14 indicate an alternative and economical source of materials. Combustible metal scrap or sponge or the like is hydrided (Block 11) by heating in a hydrogen atmosphere and is then pulverized by conventional milling steps, which are facilitated by the inherent brittleness of metal hydrides. The powder so produced is dehydrided, by heating in inert atmosphere or argon to decompose the hydride and drive off hydrogen gas, and classified by screening or like techniques to isolate powders of desired size range, the classification step preceding or following the dehydriding step.

Flashlamp Charging (FIGS. 2–5)

Figure 2:
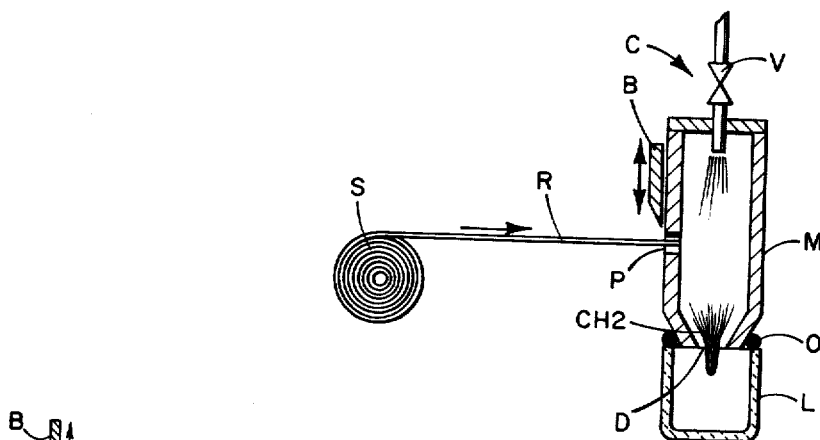
FIGS. 2 and 3 are schematic cross section sketches of charging apparatus components utilizing the charging plant feed to charge flashlamps.

FIG. 2 schematically shows the essential elements of a production plan for charging flashlamps incorporating the charging plant feed of the present invention. A long fibrous rope-form charging plant feed R of combustible metal is fed from a spool S to a cutting and charging station C where a carbide shear blade B is reciprocated to cut pre-selected lengths of the charging plant feed. The cutting and charging station C comprises, in addition to the shearing blade B, a manifold M having an entry port P and a discharge port D. A flashlamp L is butted up against the discharge port and sealed in such contact via an O-ring. Vacuum is drawn on the manifold and air jets are sprayed in at selected times via a valving system V.

FIG. 2 also shows a fibrous mass indicated as CH2 which has been sheared off from the feed R and being blown into the lamp L at the moment of time shown in the figure. Additional air jets (not shown) can be provided to take the relatively aligned fibers of the mass R and reconfigure the cut bundle into a multi-directional fibrous mass.

Constructional details of mass production apparatus for carrying out this charging can be as shown in the above cited flashlamp production patents, which are incorporated herein by reference as though set out at length herein.

Figure 3:
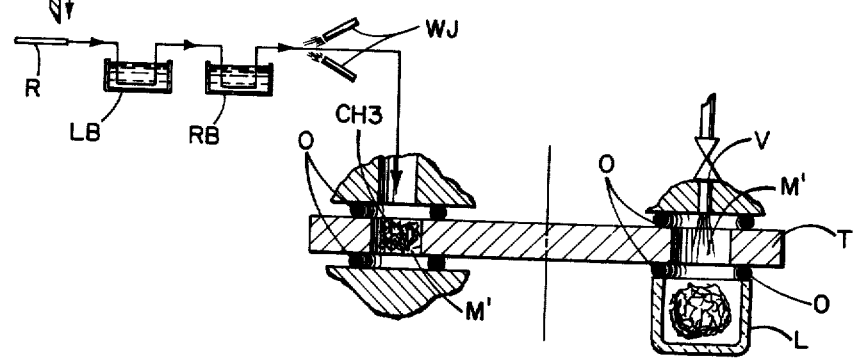

FIG. 3 shows another form of charging apparatus using a turntable T with multiple manifold ports M' therein and additional parts corresponding to FIG. 2 which have the same letters as in FIG. 2. The turntable is rotatable about an axis AA to present the different manifolds and charges to different stations, in accordance with well known construction details of flashlamp, light bulb and radio tube and television tube industries. See, e.g., U.S. Pat. No. 3,336,646 granted Aug. 22, 1967 to B. Chauvin for relevant structural details including timing means and fittings.

The charging plant feed R can be spooled and fed in the form of a loose rope or tightly bundled fibrous rope, the difference being obtained through variation in the conditions of production and matrix removal. Depending upon the efficiency of fiber fluffing arrangements in various plants — utilizing air jets and/or mechanical stirrers and paddles — the expansion and multi-direction repacking of the cut fibrous bundle can be deferred until the bundle is in the lamp. This makes for easier handling of the charging plant feed and greater tensile strength thereof. The charging manifold and lamp should have a dry inner atmosphere or vacuum therein, when handling the fresh fibers since the handling conditions involve rubbing, friction, and other possible sources of premature ignition. Once the charge is properly layed within the flashlamp, oxygen can be admitted later under non-swirling gas admission conditions free of ignition danger.

The charging plant feed can also comprise an elongated composite R, containing the combustible metal fibers therein cut to charge lengths by a blade B matrix removal in a leach bath LB and washing B before a rinse bath RB and by water jets WJ to produce a charge CH3. Alternatively, the composite can be charged to flashlamps and the flashlamps can be used as beakers for acid leaching of the matrix. Sheet form charging plant feeds can be fed to the cutting and charging station and cut to length and similarly packed and/or additionally formed into charges by slitting longitudinally int sub-bundles with less shear force and less wear on shear blades than would be involved in shearing solid sheets, as in the prior art processes discussed above. Finally, charging plant feed R can be fed into a strong air blast (inert gas) which completely disassembles the fibrous bundle of the cut-off length of charging plant feed to produce individual fibers or other sub-charge units and these units can be collected and rebundled at the end of a chute and packed as in the prior art processes for handling combustible metal filaments.

Figure 4:
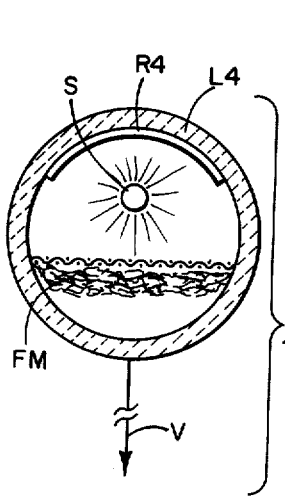
FIGS. 4 and 5 are schematic cross sections of flashlamps incorporating, respectively, sheet and cylinder forms of fibrous fuel charge
Figure 4A:
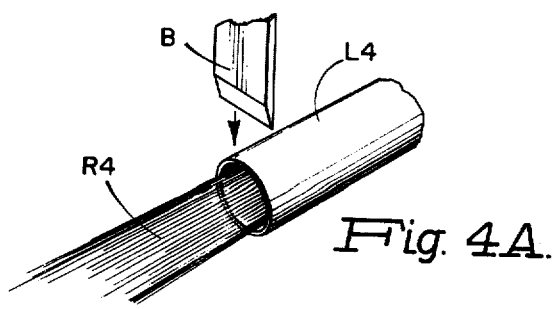
FIG. 4A is a sketch of a sheet form charging plant feed being fed to a flashlamp.

FIG. 4 shows a flashlamp L4 utilizing a sheet form charging plant feed occupying a small portion of the thickness (diameter) of the flashlamp rather than essentially the complete volume thereof. Radiant heat source S is provided in the lamp bulb at a central portion thereof as either a rod or point source of excitation and the fibrous mass FM in sheet form is arranged along a tangent (perpendicular to the radial direction) in the direction of viewing from the source S (i.e., towards the object to be illuminated as indicated by the directional arrow V). The sheet form provides a particularly useful illuminating device which is an efficient user of fibers. Whereas, the clusters of fibers used in the prior art inherently include a large portion of interior fibers which can be blocked from effective transmission of light to the viewing direction by the "outer" fibers closer to the viewed object, the FIG. 4 configuration can afford more direct line of sight between a closer approximation of all the fibers and the viewed object. Also, whereas prior art fiber clusters are vulnerable to inhibition of ignition of the interior fibers, the thin layer FM makes possible more simultaneous and complete combustion of all the fibers. FIG. 4A illustrates how the FIG. 4 above can be simply charged merely by feeding the charging plant feed directly into a bulb and cutting off. The use of relaying or expanding techniques can be avoided in this embodiment.

Figure 5:
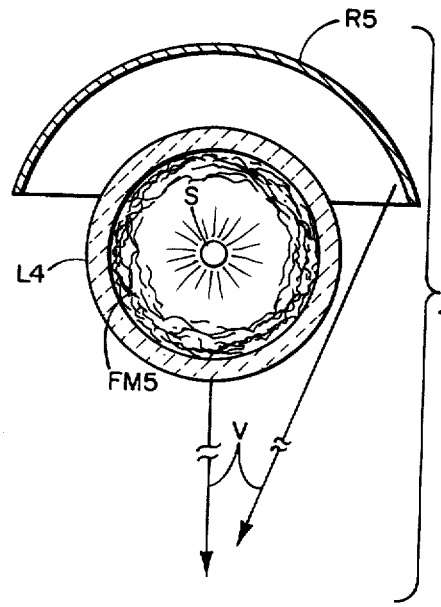

FIG. 5 shows a flashlamp L4 with a tubular sheet form fibrous mass FM5 and the figure also indicates the usual reflector element. This species of the invention also has the same benefits of sheet form construction as in the FIG. 4 embodiment, together with the provision of additional area and additional mass of combustible material.

A tubular form of the charging plant feed can be made by using matrix metal throughout the core of the original starting billet. Upon leaching a long tubular core will be produced and the tubular combustible metal fibrous mass so isolated can be handled like a rope for feeding into a bulb. It can be expanded by air jets after feeding to push it out further towards the walls of the bulb.

Figure 6:
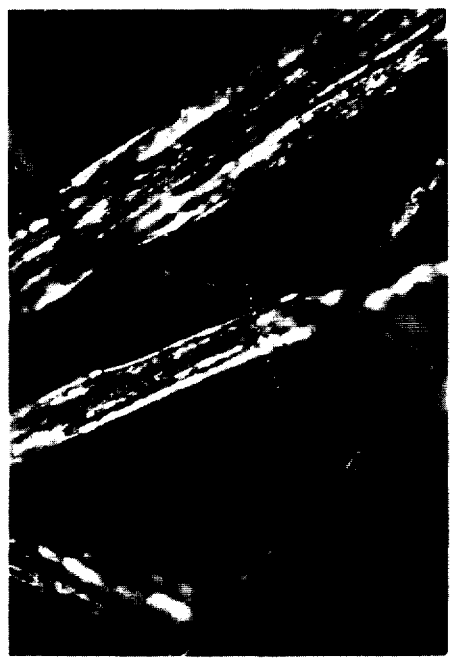

FIG. 6 is a 400 times magnified photomicrograph of a longitudinal section of a zirconium fibrous mass embedded in transparent plastic for purposes of microscopy. The mass is derived from a 26 times (diameter to diameter basis) reduction of a mixed zirconium and copper powder mixture. The fibers are dark and elongated in the picture.

Figure 7:
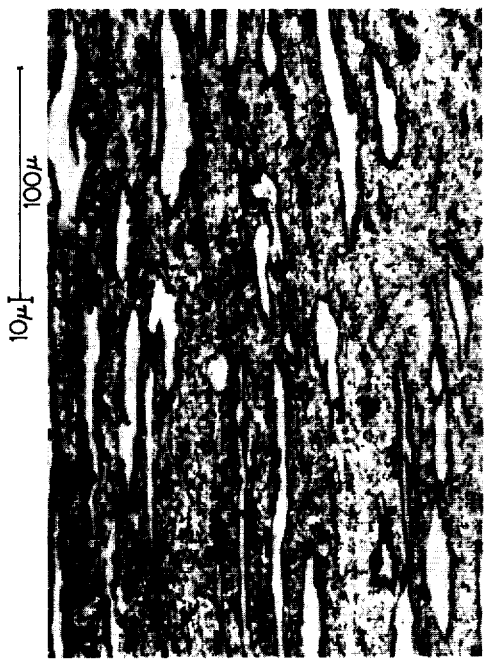
FIGS. 6–11 are photomicrographs of the fibrous mass at various stages of production thereof.

FIG. 7 is a 400 times magnified photomicrograph of a longitudinal section of a similar fibrous mass after completion of the 26 times reduction and before leaching out the copper which is the grey-to-white matrix phase seen in the picture.

Figure 9:
Figure 8:

FIGS. 8 and 9 are cross section photomicrographs, FIG. 8 being at 1,000 times and FIG. 9 at 400 times magnification. FIG. 8 shows zirconium fibers (dark dots) in a copper matrix after 29 times (diameter basis) reduction and FIG. 9 shows a similar compact after leaching, the matrix being the cast-in plastic used for microscopic specimen preparation.

Figure 11:
Figure 10:

FIGS. 10 and 11 are 800 times magnified photomicrographs showing cross sections of zirconium in copper, the dark areas being zirconium. The FIG. 10 specimen is from a composite wire which had a 28 times (diameter basis) reduction ratio applied to it in working down from billet size. The FIG. 11 specimen was reduced 19 times.

The specimens shown in FIGS. 6–11 were subjected to swaging in their cold work processing. The effect of swaging is to give a ribbon form characteristic to the fibers. For most flashlamp applications, it is preferred and distinctly advantageous that the ribbon form — meaning a transverse aspect ratio of at least 5:1 (ration of longest to shortest transverse section dimensions) — be attained. in some applications round or square cross section (with a transverse aspect ratio — i.e., about 1:1) will be preferred and this is accomplished through hydrostatic extrusion, wire drawing or limited cross-roll sheet rolling processing. Ribbon fiber form can also be achieved through sheet rolling. It is a further characteristic of the fibers in ribbon or round form that they have a characteristic worked structure, recognizable to a metallurgist, in the direction of elongation (longitudinal) in contrast to prior art shredded foil, whose worked structure (due to sheet rolling) extends perpendicular to the long dimension. For definitional purposes herein a fiber according to the present invention, or a fiber-like filament or shredded foil of the prior art is defined as one which has a longitudinal aspect ratio (ratio of longitudinal dimension in direction of elongation to largest of transverse dimensions) of at least 5:1, and preferrably 25:1. Reference to fiber diameter means, in the case of ribbon non-circular forms, the thickness or smaller transverse dimension.

For purposes of flashlamp application fiber diameter is preferrably 0.1 to 1.0 mils (i.e., 2.5 to 25 microns) with a bi-modal distribution within individual flashlamp charges, the charges having a substantial portion therein of less than 0.5 mils diameter for ease of ignition and a substantial portion therein of 0.5 to 1.0 mil diameter for desired color temperature and delayed peak light-time output characteristic. The bi-modal distribution can be achieved through separate fibers of each class or through individual fibers which have thicker and thinner segments in transverse section, as is illustrated well in FIGS. 10 and 11.

Bimodal distribution can be enhanced by using variable sizes of and/or highly structured forms of combustible metal starting materials, swaging or cross-roll cold work or fiber until blending to form a charge. Unimodal distribution, where desired, is enhanced by selection of uniformly sized spherical particles, extrusion cold working and blending selection.

Figure 12:
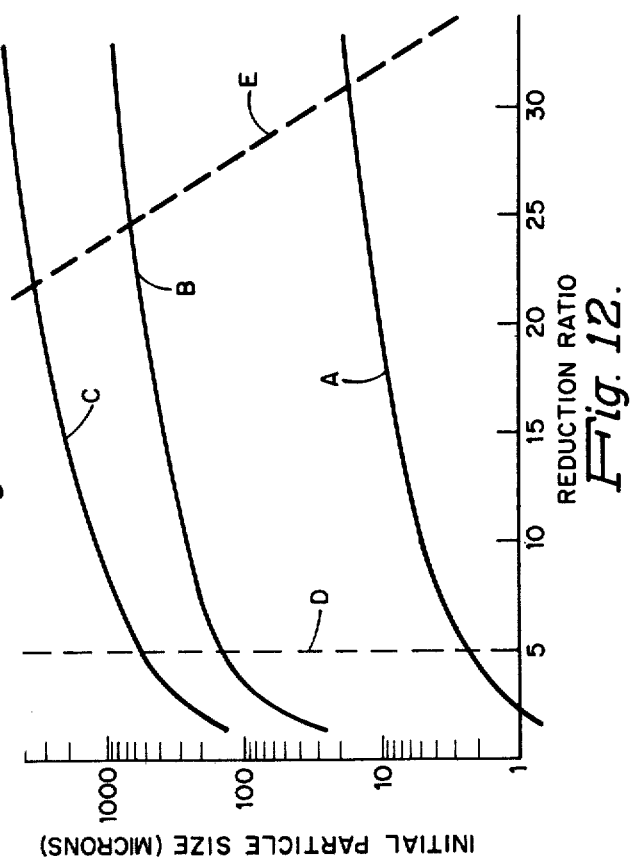
FIG. 12 is a semi-log graph indicating the relationship of initial particle size, reduction ratio and final fiber size.

FIG. 12 relates reduction ratios (diameter basis) to initial particle size for a family of curves corresponding to desired particle sizes. Curve A is for 0.5 microns final diameter, Curve B is 25 microns, Curve C is for 125 microns. Dashed line D shows a practical lower limit set on utilization of the present invention for flashlamp purposes by pyrophoricity of very fine materials and otherwise minimal contribution to objects of the invention and dashed line E shows a practical upper limit set by the fact of increased difficulty of applying high reduction ratios, particularly to overly large initial particles. The relation must be discounted as indicated above because a certain portion of initial compact reduction may not cause a corresponding fiber reduction until hardening of the matrix occurs.

The final product charge produced by any of the alternative variations above, would have a porous bundle form and would essentially occupy about half or more of flashlamp volume (although due to porosity of the bundle other components of the flashlamp could occupy the same space) and would be held in place by spring-like expansion of the bundle against the bulb walls where fiber length is greater than the span between bulk walls. In prior art shredded foils, filamentary length is 4 or 8 inches and in the present invention about 2 inch fiber lengths are preferably produced.

It is evident that those skilled in the art, once given the benefit of the foregoing disclosure, may now make numerous additional uses and modifications of and departures from the specific embodiments herein described, without departing from the concept of the invention. Accordingly, the invention is to be construed as embracing each and every novel feature and novel combination of features present in and/or possessed by the apparatus and techniques herein disclosed.

What is claimed is:

1. Process for making combustible metal fuel charges, comprising the steps of,
    distributing powders of a first metal selected from the group consisting of hafnium, yttrium, tungsten, uranium, vanadium lanthanum, cerium, scandium, tantalum, zirconium, niobium and titanium, in a matrix of a powder of a second material which can transmit cold work stresses to the first metal to elongate its powder components to fibers, the two materials being a homogeneous mixture containing the first metal as at least 20 volume percent thereof,
    forming said mixed first metal and second material into a workable compact,
    consolidating the compact through cold work,
    further cold working the compact into an elongated member through the application of compressive forces thereto to work the component powders of first metal therein into a porous bundle of primarily, mechanically interlocked fibers and carrying the cold working to a degree that first metal fibers with surface to volume ratio characteristic less than a one mil diameter fiber and at least 5 to 1 longitudinal aspect ratio are formed,
    the compact as a whole being similarly formed into an elongated member of at least 5 to 1 longitudinal aspect ratio,
    removing the matrix phase of second material from the porous bundle,
    passivating the resultant bundle to inhibit premature combustion of the fibers of the first metal,
    and feeding the bundle to a charging plant for cutting to discrete charges.

2. The process of claim 1 wherein the first metal comprises zirconium and the second metal comprises copper and wherein the metals are each provided in powder form and intermixed.

3. The process of claim 2 wherein the powders of zirconium have an average size no greater than 1,000 microns and no less than 5 microns and the powders of copper have an average size no greater than 44 microns.

4. The process of claim 3 wherein the volume percentage of zirconium in said zirconium — copper mixture is at least 20 and no greater than 40 and a majority of original zirconium particles are of 100 to 200 micron diameter.

5. The process of claim 4 wherein said matrix is removed by acid leaching under conditions which simultaneously provide an oxidation of the surfaces of fibers to form a passivating layer.

6. Process in accordance with claim 1 wherein the cold working is carried to the point of producing fibers of less than 0.5 mil diameter.

7. Process for making combustible metal fuel charges, comprising the steps of, distributing powders of a first metal selected from the group consisting of hafnium, yttrium, tungsten, uranium, vanadium lanthanum, cerium, scandium, tantalum, zirconium, niobium and titanium, in a matrix of a second material which can transmit cold work stresses to the first metal to elongate its powder components to fibers, and two materials being a homogeneous mixture, forming said mixed first metal and second material into a workable compact, cold working the compact into an elongated member through the application of compressive forces thereto to work the component powders of first metal therein into a porous bundle of interlocking fibers and carrying the cold working to a degree that first metal fibers of at least 5 to 1 longitudinal aspect ratio are formed, the compact as a whole being similarly formed into an elongated member of at least 5 to 1 longitudinal aspect ratio, removing the matrix phase of second material from the porous bundle, passivating the resultant bundle to inhibit premature combustion of the fibers of the first metal, feeding the bundle to a charging plant for cutting to discrete charges, and cutting discrete flashlamp charges from said bundle and inserting said bundle into a flashlamp bulb.

8. Process in accordance with claim 1 wherein said cold working comprises an areal reduction of at least 100:1 of said compact.

9. Process in accordance with claim 1 wherein a majority of the powders of said first metal are sized between 100 and 200 microns.

10. Process in accordance with claim 1 wherein said first metal is hafnium.

11. Process in accordance with claim 1 wherein said first metal is yttrium.

* * * * *